United States Patent [19]

Sublett

[11] Patent Number: 5,376,735
[45] Date of Patent: Dec. 27, 1994

[54] PREPARATION OF BRANCHED POLYETHYLENE TEREPHTHALATE

[75] Inventor: Bobby J. Sublett, Kingsport, Tenn.

[73] Assignee: Eastman Chemical Company, Kingsport, Tenn.

[21] Appl. No.: 104,741

[22] Filed: Jul. 12, 1993

[51] Int. Cl.$^5$ ............................................. C08F 20/50
[52] U.S. Cl. ..................... 525/437; 528/272; 528/296; 528/302; 528/308; 528/308.6
[58] Field of Search .............. 528/272, 296, 302, 308, 528/308.6, 350; 525/437

[56] References Cited

U.S. PATENT DOCUMENTS

| 4,132,707 | 1/1979 | Borman | 528/273 |
| 4,147,738 | 4/1979 | Borman | 525/439 |

Primary Examiner—Samuel A. Acquah
Attorney, Agent, or Firm—John F. Stevens; Harry J. Gwinnell

[57] ABSTRACT

Disclosed is an improved process for the preparation of branched polyethylene terephthalate and co-polyethylene terephthalate, having high melt viscosities. The process comprises carrying out the polymerization of the branched polyethylene terephthalate in intimate admixture with a small amount of isophthalic acid. Polyethylene terephthalate with high melt viscosities are obtained and are free from inhomogeneities.

11 Claims, No Drawings

PREPARATION OF BRANCHED POLYETHYLENE TEREPHTHALATE

TECHNICAL FIELD

This invention relates to the preparation of branched polyethylene terephthalate having high melt viscosity. This polyester is useful in blow molding and extrusion techniques.

BACKGROUND OF THE INVENTION

Polyethylene terephthalate (PET) has many valuable characteristics including toughness, solvent resistance, high-gloss, and the like. Articles may be fabricated from PET by a number of well known techniques including injection molding, extrusion and the like depending on the shape of the desired product. Certain techniques, in particular, blow molding and extrusion, require the molten polyethylene terephthalate have a suitably high melt viscosity, in excess of 10,000 poises, to prevent collapse or blow outs in the molten preformed state. It is well known that high melt viscosities can be achieved much easier if small amounts of a tri or higher functional ester-forming branching component is included in the polyester. Furthermore, it is still easier if the branched copolyester is subjected to solid state polymerization.

It has now been discovered that branched polyethylene terephthalate of high melt viscosity can be obtained if a small amount of isophthalic acid is intimately blended with the branched copolyester before solid stating. Consequently, the polymer melts are free from inhomogeneities.

U.S. Pat. No. 4,147,738 issued to General Electric discloses a process by which high melt viscosity polyesters are prepared by a two-step process involving incorporating a branching agent in a melt phase polyester and polymerizing to a melt viscosity less than 3,000 poises. Next, blending the melt phase polyester with up to 5 weight percent or an aromatic polycarbonate by extrusion, and solid stating the blend to a melt viscosity suitable for extrusion blow molding, usually greater than 10,000 poises.

Another patent (U.S. Pat. No. 4,132,707) discloses preparing a linear (no-branching agent) polyester precursor having a relatively low melt viscosity which can be handled on conventional polyester melt phase equipment. The melt phase precursor is blended with up to 3 mole percent branching agent by melt blending. The blend polyester-branching agent is further reacted to reach the desired, usually greater than 10,000 poises, melt strength suitable for the required end use.

SUMMARY OF THE INVENTION

This invention is different from and has other advantages than the processes disclosed in U.S. Pat. Nos. 4,132,707 and 4,147,738. The invention is a process for obtaining a high melt viscosity polyester or copolyester suitable for extrusion blow molding or other end uses in which a high melt viscosity polyester has definite advantages. Such high melt viscosity polyesters are useful, for example, in extrusion blow molding articles such as bottles. My invention encompasses preparing a branched polyester by bulk melt phase process with a melt viscosity of 3,000 poises or less. Then blending the branched copolyester with up to 3 mole percent isophthalic acid by extrusion blending and solid stating the blend to the desired melt viscosity. The bulk melt phase process can be either a conventional batch process or a continuous process.

The branching agents that have been found to be useful are those containing at least three ester forming groups. These include trimellitic acid and anhydride, trimesic acid and the like, and glycol modifiers such as pentaerythritol, trimethylolpropane or hydroxy or dihydroxy carboxylic acids such as dimethyl hydroxy terephthalate.

One advantage of preparing the branched precursor with melt phase polycondensation is that if a linear precursor is prepared and then blended with the branching agent some of these branching agents are liquid and are all but impossible to blend with solid polymer prior to the solid stating step. Another advantage is that the branched precursor has a much faster solid stating rate to reach a high melt viscosity than does a linear or unbranched precursor which is blended with trifunctional branches and then solid stated. Solid stating a branched polyethylene terephthalate without blending with isophthalic acid to a high melt viscosity prior to solid stating usually results in a polymer which contains insoluble inhomogeneities. The process of this invention and the processes disclosed in both cited U.S. Pat. Nos. (4,132,707 and 4,147,738) produce a high melt viscosity polymer that is free of inhomogeneities.

DESCRIPTION OF THE INVENTION

The inventor has found an improved method for the preparation of high melt viscosity branched polyethylene terephthalate through the addition of isophthalic acid during the process. The high melt viscosity branched polyethylene terephthalate contains from 0.01 to 3 mole percent, based on terephthalate units, the residue of a branching agent having at least three ester-forming groups. The branched polyethylene terephthalate has a melt viscosity greater than 8,000 poises. The process comprises:

(a) forming an intimate blend of 0.1 to 5.0 percent by weight of isophthalic acid and a corresponding, normally solid branched polyethylene terephthalate having a melt viscosity of below 3,000 poises and transforming the blend into a solid particulate state, and (b) heating the particles of the solid branched polyethylene terephthalate-isophthalic acid blend at a temperature of above 150° C. and below the melting point of polyethylene terephthalate in the presence of an inert gas until the desired melt viscosity is obtained. Polyethylene terephthalate is preferred because it possesses good oxygen barrier qualities for plastic food containers.

The melt viscosity is determined under the conditions specified in accordance with ASTM D-3835-90. Typically, a "high melt viscosity" polyethylene terephthalate is of greater than 8,000 poises. A preferred polyethylene terephthalate according to this invention is one having a melt viscosity of greater than 11,000 poises at temperatures in excess of 250° C.

The polyester resins with which this invention is concerned are, in general saturated condensation products of $C_2$–$C_{10}$ glycols. For example, ethylene glycol (preferred), propylene glycol, 1,4-butanediol, 1,6-hexanediol, 1–10 decanediol, 1,4-cyclohexane-dimethanol, and the like. Also, terephthalic acid or an ester forming derivative thereof such as dimethyl terephthalate. In addition to the terephthalic acid units, other dicarboxylic acid units, such as adipic, naphthalene dicarboxylic, isophthalic and orthophthalic units may be present in small amounts, for example, up to about 15 mole percent of the total acid units in the melt phase portion of the polyester. Also, conventional trifunctional branching agents are added.

The branched high melt viscosity polyethylene terephthalate resins include a small amount of branching agent containing at least three ester-forming groups.

The branching agent can be one which provides branching in the acid unit portion of the polyester, or in the glycol unit portion, or it can be a hybrid. Illustrative of such branching agents are polyfunctional acids, polyfunctional glycols and acid/glycol hybrids. Examples include tri or tetracarboxylic acids, such as trimesic acid, pyromellitic acid and lower alkyl esters thereof and the like, and tetrols such as pentaerythritol. Also triols such as trimethylopropane or dihydroxy carboxylic acids and hydroxydicarboxylic acids and derivatives, such as dimethyl hydroxy terephthalate, and the like have been successfully used.

The branched polyesters are used as starting materials because the final properties are far better than linear polyesters for a broad number of uses where high melt strength is important. Moreover, such branched materials reach a higher melt viscosity more rapidly than the unbranched materials when used in solid state processes. The lower molecular weight with a low melt viscosity of less than 3,000 poises are much easier to produce on conventional polyester melt phase polyester equipment. To produce a polyester with a melt viscosity of greater than 3,000 poises on conventional melt phase polyester equipment is impractical and in some cases impossible.

The relative amount of branching agent may vary, but is always kept a minor portion, such as up to 5 mole percent maximum for every 100 moles of acid units in the branched polyester. Preferably the range of the branching agent included in the esterification or transesterification mixture, and generally that included in the starting material, will be from about 0.01 to about 3 mole percent based on the acid units. Especially preferable, it will comprise from about 0.02 to about 1.0 mole percent, based on the acid component.

Processes for preparing the branched polyester starting materials used in this process are well known to those skilled in the art. Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelic, sebacic, fumaric, maleic, iraconic, 1,4-cyclohexane-dimethanol diethylene glycol and mixtures thereof. Examples of suitable glycols include ethylene glycol, propylene glycol, butanediol, pentanediol, hexanediol, 1,4-cyclohexanedimethanol diethylene glycol and mixtures thereof. Such polyesters are well known in the art and may be produced by well-known techniques, e.g., those described in U.S. Pat. Nos. 2,465,319 and 2,901,466. The preferred polyester is polyethylene terephthalate.

The process of this invention is carried out in several steps. Preparing a branched polyester under a melt phase process to a melt viscosity of about 3,000 poises. Making an intimate blend of the branched polyethylene terephthalate and the isophthalic acid, e.g., by coextrusion, milling, intensive mixing, etc. and then transforming the polyethylene terephthalate-isophthalic acid blend to a solid particulate stage. Finally, heating the particles until the desired degree of increase in melt viscosity is obtained.

The general procedure for making the starting resins is a conventional condensation in the melt state, using an excess alkanediol to dialkyl terephthalate or terephthalic acid and the desired branching agent. The mixture is stirred, subjected to a nitrogen sweep, heated from 150°–220° C. for about 3 hours to effect transesterification. Ideally the heating range is 200°–220° C. The mixture's temperature is increased to about 280° C. and heated at a reduced pressure of 0.16 mm of Hg for approximately 1 hour extruded, and pelletized.

Next, from about 0.1 to about 5.0 percent by weight isophthalic acid is added to the branched pelletized polyester. The polyethylene terephthalate-isophthalic acid blend formed into solid particles and is solid state polymerized by heating preferably from 200° to 230° C. under a high vacuum of 0.1 to 10 mm Hg for 2 to 24 hours to build molecular weight.

The polyethylene terephthalate-isophthalic acid blend is extruded at temperatures upwards to 300° C., pelletized, crystallized, and solid state polymerized at about 210°–220° C. under a nitrogen flow rate of 4 standard cubic feet per hour. Conventional solid state polymerization equipment and techniques are used. The melt viscosity of the precursor will be less than 3,000 poises, and typically, from 1,000 to 2,000 poises.

The preferred inert gas is nitrogen, although if desired, argon, helium, carbon dioxide, or mixtures thereof may be employed.

Inherent viscosity is measured at 25° C. using 0.5 g polymer per 100 ml of a solvent consisting of 60% by weight phenol and 40% by weight tetrachloroethane. The basic method is set forth in ASTM D-2857-70.

The following non-limiting examples are submitted to illustrate the process of this invention.

EXAMPLE 1

Into a 500 ml round bottom three-neck flask is weighed 96.8545 g (0.49925 moles) of dimethyl terephthalate, 62 grams (1.0 moles) of ethylene glycol, 2.52 g (0.175 moles) of 1,4-cyclohexanedimethanol, and 0.144 g (0.00075 moles) of trimellitic anhydride, 0,166 ml of titanium tetraisopropoxide solution in ethylene glycol which is 1.136 percent titanium, 1.4 ml of a cobalt acetate tetrahydrate solution in ethylene glycol that is 0.488 weight percent cobalt, 2.4 ml of antimony oxide solution in ethylene glycol which is 0.98 weight percent antimony and 1.3 ml of a Merpol A (Trademark) solution in ethylene glycol which is 1,008 weight percent phosphorous.

The 500 ml round bottom three-neck flask equipped with a nitrogen inlet and an agitator is heated in a Belmont metal bath with a nitrogen sweep for 1 hour at 200° C. and 2 hours at 210° C. with a nitrogen sweep and stirring. The temperature of the Belmont bath is increased to 280° C. and the pressure is reduced to approximately 0.2 mm of Hg.

The polymer mix undergoes polycondensation for approximately 25 minutes after which time the reaction is stopped and the polymer cooled and removed from the flask. The polymer has a melt viscosity at 280° C. of 1800 poise as measured using a capillary rheometer as described in ASTM D-3835-90, and an inherent viscosity of 0.53. The polymer was ground blended with 0.11 mole percent isophthalic acid and extruded at 300° C. using a small Brabender (Trademark) extruder. The polymer was pelletized, crystallized and solid state polymerized at 215° C. in a laboratory solid stater with a nitrogen flow rate of 4 standard cubic feet per hour (SCFH). The polymer had an inherent viscosity of 0.90 and the melt viscosity at 265° C. was 11,950 poise. Upon visual inspection the polymer was clear and gel free.

EXAMPLE 2

Comparative

The experiment in Example 1 was repeated except that no isophthalic acid was compounded in the polymer. The solid stated polymer had an inherent viscosity of 0.77 and the melt viscosity at 265° C. was 4434 poise. Unlike the polymer in example 1 even at lower melt viscosity this polymer melt appeared full of inhomogeneities such as gels and fish-eye shaped particles.

EXAMPLE 3

Example 1 was repeated except that 0.20 mole percent isophthalic acid was compounded into the polymer by extrusion in a Brabender (Trademark) extruder. The solid state polymer had an inherent viscosity of 0.84 and the melt viscosity of the polymer measured at 265° C. was 11,920 poise. Upon visual inspection the polymer melt was gel free and showed no signs of any inhomogeneity in the melt.

Other modifications and variations of the present invention are possible in the light of the aforementioned teachings. It is to be understood that changes may be made in the particular embodiment described which will be within the full intended scope of the invention as defined by the appended claims.

I claim:

1. An improved method for the preparation of high melt viscosity branched polyethylene terephthalate which contains from 0.01 to 3 mole percent, based on terephthalate groups, of the residue of a branching agent having at least three ester-forming groups, said branched polyethylene terephthalate having a melt viscosity of greater than about 8,000 poises, said process comprising:

(a) forming an intimate blend of 0.1 to 5.0 percent by weight of isophthalic acid and a corresponding, normally solid branched polyethylene terephthalate having a melt viscosity below 3,000 poises and forming said blend into a solid particulate state, and (b) heating the particles of solid branched polyethylene terephthalate-isophthalic acid blend at a temperature of above 150° C. and below the melting point of said polyethylene terephthalate in the presence of an inert gas until the desired degree in melt viscosity is obtained.

2. The process according to claim 1 wherein heating step (b) is carried out between 150° and 245° C.

3. The process according to claim 1 wherein heating step (b) is carried out between 200° and 245° C.

4. The process according to claim 1 wherein the inert gas is nitrogen

5. The process according to claim 1 wherein said branching agent which contains at least three ester forming groups is an aromatic tricarboxylic acid.

6. The process according to claim 5 wherein said branching agent is trimellitic anhydride, trimellitic dianhydride, or trimellitic tetracarboxylic acid.

7. The process according to claim 1 wherein said branching agent is pentaerythritol 8. The process according to claim 1 wherein said branching agent is trimethylolpropane.

9. The process according to claim 1 wherein said branching agent is a dihydroxy carboxylic acid.

10. The process according to claim 1 wherein said branching agent is dimethyl hydroxy terephthalate.

11. The process according to claim 1 wherein said melt viscosity of said branched polyethylene terephthalate is greater than 8,000 poise.

* * * * *